Patented Feb. 13, 1934

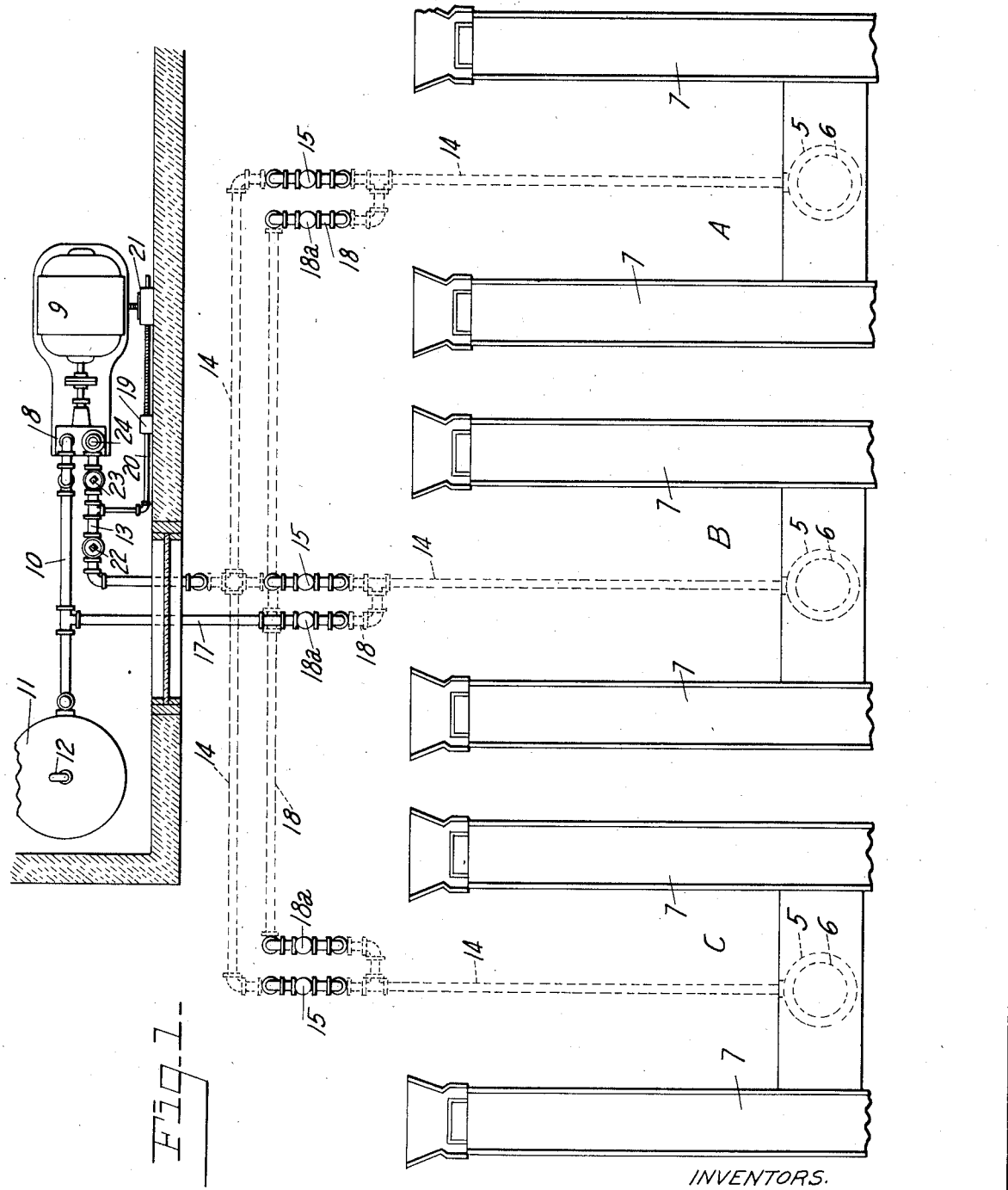

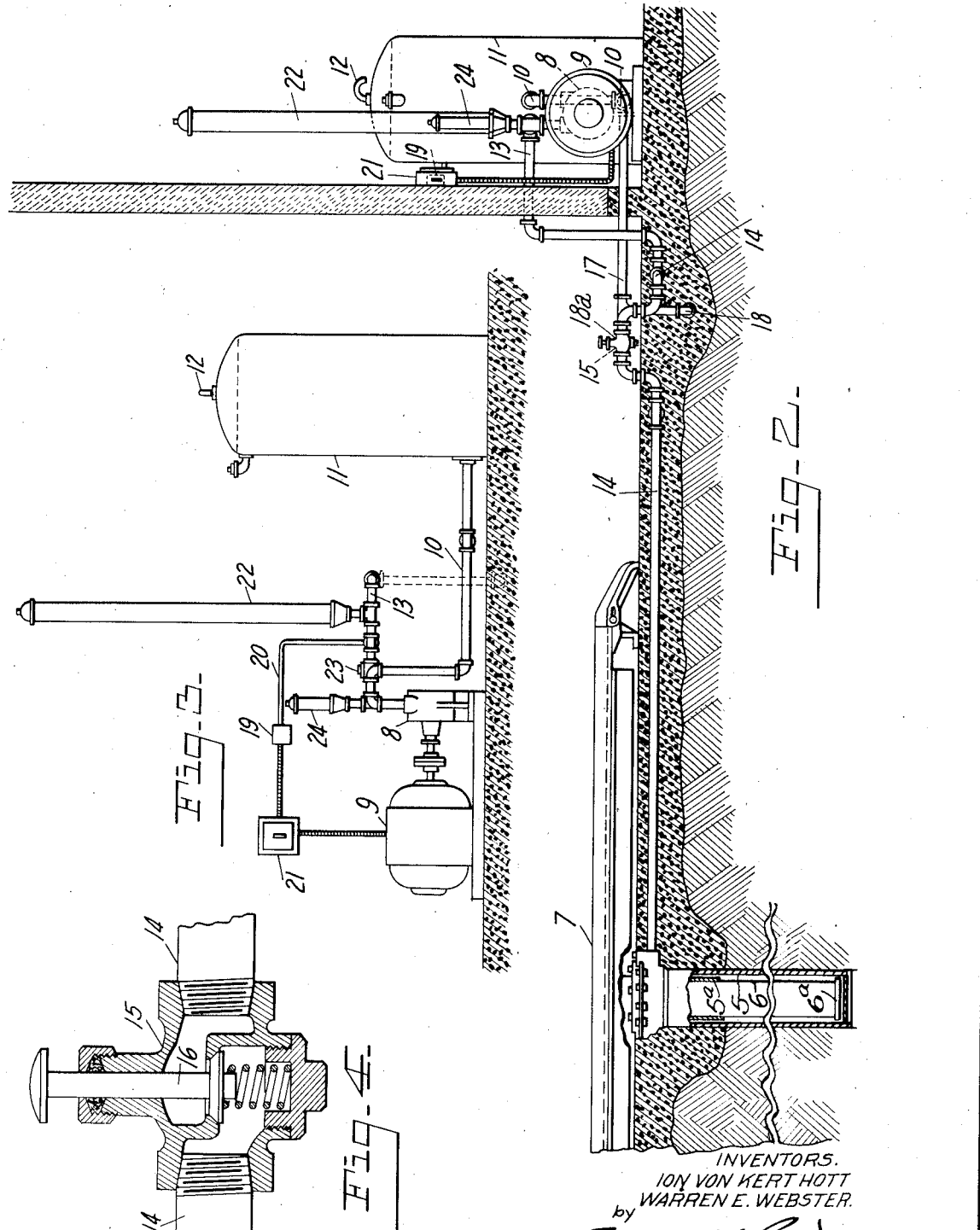

1,946,937

UNITED STATES PATENT OFFICE 1,946,937

HYDRAULIC LIFT FOR AUTOMOBILES AND THE LIKE

Ion Von Kert Hott and Warren E. Webster, Dayton, Ohio, assignors to The Joyce-Cridland Company, Dayton, Ohio, a corporation of Ohio Application November 7, 1930. Serial No. 494,104

4 Claims. (Cl. 138—9)

This invention relates to hydraulic lifts for automobiles and the like.

One object of the invention is to provide an improved operating mechanism which can be quickly and easily operatively connected with one automobile lift or with a plurality of such lifts.

A further object of the invention is to provide an operating mechanism for an automobile lift which will maintain a constant supply of liquid under pressure and which can be instantly applied to the lift by the manipulation of a valve.

A further object of the invention is to provide an operating mechanism for an automobile lift in which the pressure on the pump will be automatically relieved when the operation of the pump is interrupted, thus permitting the motor to start without load and reducing the likelihood of leakage.

Other objects of the invention will appear as the mechanism is described in detail.

In the accompanying drawings Fig. 1 is a top plan view of an automobile lift installation embodying our invention, with the lifts partly broken away; Fig. 2 is a side elevation of the same; Fig. 3 is a front elevation of the operating mechanism; and Fig. 4 is a detail view of one of the controlling valves.

In these drawings we have illustrated one embodiment of our invention and have shown the same in connection with an installation comprising a plurality of automobile lifts but it will be understood that the mechanism may take various forms and may be used in connection with one or more lifts.

In the installation here illustrated there are three lifts indicated at A, B and C, each of which comprises a cylinder 5 and a piston 6 mounted in the cylinder and supporting on its upper end a pair of runways or tracks 7 to receive the vehicle. These several lifts are operated from a single operating mechanism which comprises a motor operated pump, which is shown conventionally at 8 as a rotary pump and is operatively connected with an electric motor 9. The pump 8 is connected by means of a pipe 10 with a suitable source of supply for oil, or other liquid, such as a tank 11, this tank being here shown as vented at 12. Leading from the outlet side of the pump is a pressure line 13 with which are connected a plurality of branch pipes 14 leading to the cylinders of the respective lifts. In each of these branch pipes is a controlling valve 15 which is preferably of the type shown in Fig. 4 and is in the nature of a check valve having a plunger or other operating device 16 by means of which it may be manually operated. This check valve is so arranged in the branch pipe that it will be held to its seat by the pressure in the pressure line 13. A return line 17 is connected with the source of liquid supply, in the present instance through a portion of the pipe 10, and this return line is connected through branch pipes 18 with the cylinders of the respective lifts. As here shown, each return branch 18 is connected with a supply branch 14 between the check valve 15 and the cylinder so that a portion of each branch pipe 14 operates both as a supply or pressure pipe and as a return pipe. In each of the branch return pipes 18 is a control valve 18a similar to the valve 15 and so arranged that it will be held normally closed by the pressure of the liquid in the cylinder.

A pressure operated switch 19 is connected with the pressure line 13, through a pipe 20, and controls the circuit through the motor 9. Preferably a master switch 21 is interposed between the pressure switch and the motor so that the circuit may be manually broken or closed. Ordinarily this master switch will be closed at the beginning of the day's business and will remain closed until the service station is closed for the day. During the time that the master switch is closed the motor is controlled by the pressure operated switch 19.

When the valve 15 in the pressure line is closed the pressure switch will operate almost instantly to break the circuit through the same, and the line being filled with non-compressible liquid the tendency would be to stop the pump and the motor instantly, if no means were provided to prevent this. Inasmuch as such a sudden stopping of the motor is undesirable we have provided means which serve not only to gradually stop the motor and the pump but also serve to provide a supply of liquid under pressure which will be instantly available when the valve in the pressure line is again opened. For these purposes we have connected with the pressure line 13, between the pump and the valve, a pressure reservoir 22 which is here shown as an elongated tubular structure closed at its upper end and adapted to contain a quantity of air. This reservoir is in open communication with the pressure line and the oil or other liquid will be forced into the same against the pressure of the air so that it will contain more or less pressure at all times. When the valve in the pressure line is closed the continued operation of the motor and pump, by momentum, will force additional fluid into this reservoir, thus storing the same under relatively high pressure and at the same time gradually stopping the pump and the motor. When the valve in the pressure line is again opened this pressure which has been stored in the reservoir 22 is immediately available and is applied to the lift. However, the quantity of liquid being relatively small the pressure will quickly fall and the pressure switch will again close the circuit through the motor causing the pump to operate and provide additional pressure for the continued operation of the lift. When the piston of the lift reaches the upper limit of its movement and its movement is interrupted the pressure will build up in the pressure line and the pressure switch will be operated to automatically stop the motor and the pressure reservoir will again function to store pressure and to gradually stop the motor. The upward movement of the piston may be limited by any suitable means and, in the present construction, the piston is provided at its lower end with the usual shoulder 6a arranged to engage the fixed part 5a near the upper end of the cylinder.

When the motor stops the pump is ordinarily subjected to the pressure of the liquid in the pressure line, or in a part thereof, which makes it necessary to start the motor under this load and also increases the likelihood of leakage at the stuffing box and other joints in the pump. The pressure line 13 is provided with a forwardly opening check valve 23 arranged between the point of connection of the pressure conduit 20 with the line and the pump and in order to automatically relieve the pressure on the pump we have connected with the latter, in the rear of the check valve 23, a pressure reservoir 24, which is also shown as tubular in form and adapted to contain a quantity of air which will be placed under pressure by the operation of the pump. When the motor is stopped the expansion of the air in the reservoir 24 will impart a reverse movement to the pump sufficient to discharge a portion of the liquid through the line 10 and thus relieve the pressure on the pump, thereby permitting the motor to be started without load and reducing the likelihood of leakage.

With the installation here shown a plurality of automobile lifts are all operated from a single pumping unit and the pressure may be applied selectively to any one or any number of the lifts. The operation of the pump is automatically controlled. At the beginning of the day's business the master switch 21 is closed and, assuming that the pressure is down, the motor will immediately operate to build up the predetermined pressure in the pressure line and when any lift is to be operated it is only necessary for the operator to actuate the valve 15 of that particular lift, either by hand or by foot, and pressure is immediately applied to the lift and the pump set in operation to maintain this pressure until the lift has reached the limit of its movement, when the motor is automatically stopped. Inasmuch as the valves 15 and 18a are normally closed no liquid can escape from the cylinder of the lift after the pump is stopped and the lift will be locked in its elevated position. When the load is to be lowered the valve 18a is operated manually, thus permitting the escape of the liquid from the cylinder and the lift is lowered by gravity. Should any single installation include more lifts than can be conveniently operated by a single pump it will be obvious that an additional pump and motor may be connected with the pressure line in order to supply the latter with the necessary amount of liquid. Further, it will be obvious that while the device is designed primarily for use with a plurality of lifts it may be used with a single lift.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent, is:

1. In an operating mechanism for an automobile lift comprising a cylinder and a piston, a liquid supply reservoir, a pump connected with said reservoir, said pump and said reservoir being mounted at points remote from said lift, a pressure line leading from said pump directly to said cylinder and adapted to deliver liquid under pressure from said pump to said cylinder, a return line leading from said cylinder to said reservoir, separately operable valves in said pressure line and said return line, each valve having means under the control of the operator for opening the same and having means for automatically closing the same when released by said operator, a stop to positively limit the outward movement of said piston, an electric motor to operate said pump, an automatic switch connected in circuit with said motor and having pressure operated means connected with said pressure line to close the switch when the valve in said pressure line is opened and to open the switch when said piston engages said stop and pressure builds up in said cylinder, and pressure controlled means connected with said pressure line to permit a continued movement of said pump and said motor by momentum after the flow of liquid through said pressure line has been interrupted and the circuit for said motor has been broken.

2. In an operating mechanism for an automobile lift comprising a cylinder and a piston, a liquid supply reservoir, a pump connected with said reservoir, said pump and said reservoir being mounted at points remote from said lift, a pressure line leading from said pump directly to said cylinder and adapted to deliver liquid under pressure from said pump to said cylinder, a return line leading from said cylinder to said reservoir, separately operable valves in said pressure line and said return line, each valve having means under the control of the operator for opening the same and having means for automatically closing the same when released by said operator, a stop to positively limit the outward movement of said piston, an electric motor to operate said pump, an automatic switch connected in circuit with said motor and having pressure operated means connected with said pressure line to close the switch when the valve in said pressure line is opened and to open the switch when said piston engages said stop and pressure builds up in said cylinder, and a pressure reservoir containing air connected with said pressure line to receive liquid from said pump and maintain a constant operative pressure in said pressure line and to gradually stop said motor when the circuit for said motor has been broken.

3. In an operating mechanism for an automobile lift comprising a cylinder and a piston, a liquid supply reservoir, a pump connected with said reservoir, said pump and said reservoir being mounted at points remote from said lift, a pressure line leading from said pump directly to said cylinder and adapted to deliver liquid under pressure from said pump to said cylinder, a return line leading from said cylinder to said reservoir, separately operable valves in said pressure line and said return line, each valve having means under the control of the operator for opening the same and having means for automatically closing the same when released by said operator, a stop to positively limit the outward movement of said piston, an electric motor to operate said pump, an automatic switch connected in circuit with said motor and having pressure operated means connected with said pressure line to close the switch when the valve in said pressure line is opened and to open the switch when said piston engages said stop and pressure builds up in said cylinder, and a pressure reservoir connected with the outlet of said pump to receive liquid therefrom and store the same under pressure while said pump is in operation and to deliver liquid under pressure to said pump to move the latter in a reverse direction after the operation of said pump has been interrupted.

4. In an operating mechanism for an automobile lift comprising a cylinder and a piston, a pressure line leading to said cylinder, a return line leading from said cylinder, separately operable valves in said pressure line and said return line, each valve having means under the control of the operator for opening the same and having means for automatically closing the same when it is released by the operator, a pump to supply liquid under pressure to said pressure line, a motor to operate said pump, means controlled by the pressure in said pressure line to start and stop said motor, a pressure reservoir connected with said pressure line, a forwardly opening check valve in said pressure line between said pressure reservoir and said pump, and a second pressure reservoir connected with said pump in the rear of said check valve to receive pressure from said pump when the latter is in operation and to move said pump in a reverse direction when the operation of said motor has been interrupted.

ION VON KERT HOTT.
WARREN E. WEBSTER.